United States Patent [19]
Clark

[11] Patent Number: 5,855,152
[45] Date of Patent: Jan. 5, 1999

[54] ASSEMBLY FOR OPERATING A ROTARY TOOL TURRET OF A LATHE

[75] Inventor: James R. Clark, Louisville, Ky.

[73] Assignee: S&S Tool and Machine Co., Louisville, Ky.

[21] Appl. No.: 769,501

[22] Filed: Dec. 18, 1996

[51] Int. Cl.⁶ .............................. B23B 39/20; B23B 3/16
[52] U.S. Cl. .............................. 82/121; 82/120; 82/159; 29/39
[58] Field of Search .............................. 82/121, 120, 159, 82/1.11, 71, 99.1; 408/35; 29/35.5, 39, 40, 41

[56] References Cited

U.S. PATENT DOCUMENTS

| Re. 34,155 | 1/1993 | Link ....................................... 82/120 X |
|---|---|---|
| 1,291,488 | 1/1919 | Haas . |
| 1,303,297 | 5/1919 | Haas . |
| 1,441,088 | 1/1923 | Hofstetter . |
| 3,107,581 | 10/1963 | Ackerman ................................. 91/275 |
| 4,414,733 | 11/1983 | Janotik et al. ............................. 29/568 |
| 5,007,314 | 4/1991 | Hafla et al. ............................ 82/121 X |
| 5,065,492 | 11/1991 | Von Haas et al. ....................... 29/39 X |
| 5,127,291 | 7/1992 | Lothammer ................................ 82/120 |
| 5,187,847 | 2/1993 | Thumm et al. ....................... 29/48.5 A |

FOREIGN PATENT DOCUMENTS

| 299556 | 1/1989 | European Pat. Off. ................. 82/121 |
|---|---|---|
| 5-104402 (A) | 4/1993 | Japan . |

*Primary Examiner*—Andrea L. Pitts
*Assistant Examiner*—Henry W. H. Tsai
*Attorney, Agent, or Firm*—Maurica L. Miller, Jr.

[57] ABSTRACT

A compressed air valve circuit actuated assembly for operating a rotary tool turret of a lathe is disclosed which includes an actuator movably disposed in a housing and fixedly connected through an opening to the turret. The actuator moves linearly between a recessed position, wherein a first actuator attached ring of spaced apart teeth is closely intermeshed with a second housing attached ring of identical teeth, and an advanced position wherein the rings are decoupled to permit turret and actuator rotation. A series of compressed coil springs confined between the actuator and housing biases the actuator toward the recessed position. Compressed air supplied from the circuit to a housing chamber moves the actuator to the advanced position in opposition to the springs. A cross-piston, disposed in a bore formed in a housing surface portion and movable between start and ending positions, is coupled by an indexing pin to a slot in the actuator only when the actuator is in the advanced position. The circuit actuates the cross-piston to move and, simultaneously, cause the pin to rotate the actuator through a predetermined angle while the actuator is advanced, whereafter, the circuit switches to permit the springs to return the actuator to the recessed position to decouple the pin from the slot. The circuit then return operates to return the cross-piston to the start position to complete an assembly operating cycle.

29 Claims, 7 Drawing Sheets

ASSEMBLY FOR OPERATING A ROTARY TOOL TURRET OF A LATHE

BACKGROUND OF THE INVENTION

This invention relates broadly to a mechanism for operating the rotary tool turret of a lathe and, more specifically, to a pneumatically actuated tool turret operating assembly for a lathe.

Broadly speaking, pneumatically actuated rotary tool turret operating systems for lathes have long been known and used in the prior art. See, for example, U.S. Pat. No. 5,187,847 issued to H. Thumm on Feb. 23, 1993. The prior art system disclosed in the patent to Thumm employs a first rim of teeth fixedly attached relative to a tool turret and a second rim of teeth which is immovable relative to a housing. A locking member is employed which also includes teeth and is arranged for slidable movement between a locking position and an unlocking position by means of an air operated piston. The teeth of the locking member engage the teeth of the first and second rims when in the locking position to immobilize the turret to maintain one of the turret tools in an operative position relative to a work piece held in the lathe. The teeth of the locking member disengage the teeth of at least one of the rims when the locking member is disposed in an unlocked position so that the tool turret can be rotated by a motor and gear train to move another tool mounted on the turret into the operating position in place of a tool which previously occupied that position.

One difficulty that can be encountered using the system of Thumm occurs due to the requirement of a relatively high air pressure on a piston in order to maintain the locking member in engagement with the other two rims of teeth so as render the tool turret immobile. A sudden loss or substantial variation in piston air pressure for any reason can cause the locking member to become decoupled from one or both of the other rims and thus render the turret freely rotatable. If a turret tool happens to be in contact with or in close proximity to a rotating work piece during such an air pressure failure or variation, the system can crash resulting in potentially severe damage to the lathe and even injury to operating personnel who may be present in the work area.

Another difficulty with such a prior art system arises from the use of a three piece tooth coupling arrangement for locking the turret in position because a very slight amount of wear in any of these three components will produce play or looseness in their coupling which can produce play in the turret when supposedly locked to the housing. This, in turn, can produce distortions in a work piece being machined in the lathe. Yet another difficulty encountered with such prior art systems is the relative complexity and expense of providing a gear train and motor for rotating the tool turret when unlocked. Still another difficulty encountered using such prior art systems is in the lack of provision for inhibiting contamination of the internal components from the surrounding work place environment.

By means of the present invention, these and other difficulties encountered using such prior art systems are substantially eliminated.

SUMMARY OF THE INVENTION

It is an object of the present invention to provide a novel assembly for operating a rotary tool turret of a lathe.

It is a further object of the present invention to provide such an assembly which includes a main actuator fixedly attached to such a turret which is linearly movable between a recessed position and an advanced position wherein the actuator is biased to a stationary condition.

It is another object of the present invention to provide such an assembly which can be actuated to move the turret entirely by compressed air supplied through an external air valve switching circuit.

It is yet another object of the present invention to provide such an assembly which employs a linearly movable cross-piston having an indexing pin which engages a slot in an actuator to rotate the same as the cross-piston moves from a start position to an ending position only while the actuator is advanced, the indexing pin being decoupled from the actuator when the latter is moved to a recessed position to permit return of the cross-piston to the start position.

It is also an object of the present invention to provide such an assembly which includes a movable actuator disposed in a housing and fixedly attached to a lathe turret which is stationarily locked to the housing by a pair of rings containing teeth which are closely intermeshed when the actuator is disposed in a recessed position, the rings being disengaged to permit actuator and turret rotation when the actuator is disposed in an advanced position.

It is still another object of the present invention to provide an assembly for operating a turret which will not result in play in the turret when immobilized due to wear of the locking mechanism.

It is also an object of the present invention to provide an entirely pneumatically actuated assembly for operating a rotary tool turret.

Briefly, in accordance with the invention there is provided a housing and an actuator movably mounted in the housing. A tool turret of a lathe is fixedly attachable to the actuator through an opening in the housing for movement therewith. The actuator is selectively rotatable through a predetermined angle and is selectively movable linearly between a first position and a second position. A mechanism for selectively locking the actuator to the housing to maintain the turret in fixed position is also provided. A biasing mechanism is provided which is operatively disposed between the actuator and the housing which tends to maintain the actuator in the first position wherein the locking mechanism is operative. A turret translating device is further provided for selectively moving the actuator from the first position to the second position in opposition to the biasing mechanism to unlock the locking mechanism. A turret rotating device is provided which is selectively operatively connected between the housing and actuator only when the actuator is disposed in the advanced position for rotating the actuator through a predetermined angle.

These and other objects, features and advantages of the present invention will become apparent to those skilled in the art from the following detailed example and attached drawings upon which, by way of example, only a preferred embodiment of the present invention is illustrated and explained.

DESCRIPTION OF THE PREFERRED EMBODIMENT

Figure 1:
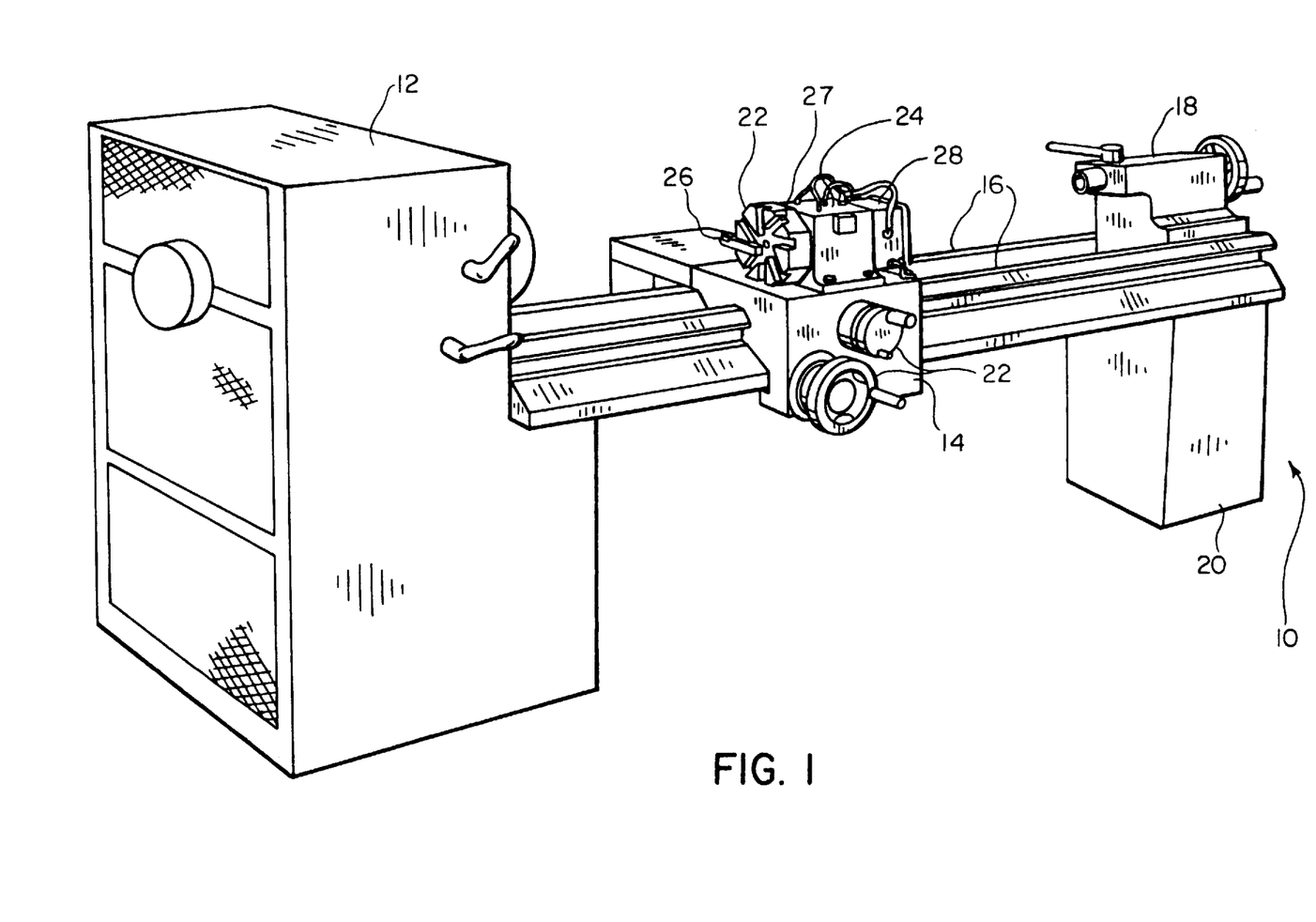
FIG. 1 shows a perspective view of a turret lathe having a multi-position tool turret and a compressed air actuated operating assembly, thus illustrating a preferred embodiment of the present invention.

Referring now to the drawing figures and, in particular, to FIG. 1 there is shown, in a preferred embodiment of the present invention, a turret lathe generally designated 10. Conventional components of the lathe 10 include a head stock 12 which houses a front support frame, a work piece spindle, an electric motor and a gear box, all of well known type and, therefore, not shown. Other conventional components include a carriage 14 movably mounted on a set of ways 16, a longitudinally and manually movable tail stock 18, a rear support frame 20 and a rotatable tool holding turret 22.

Figure 10:
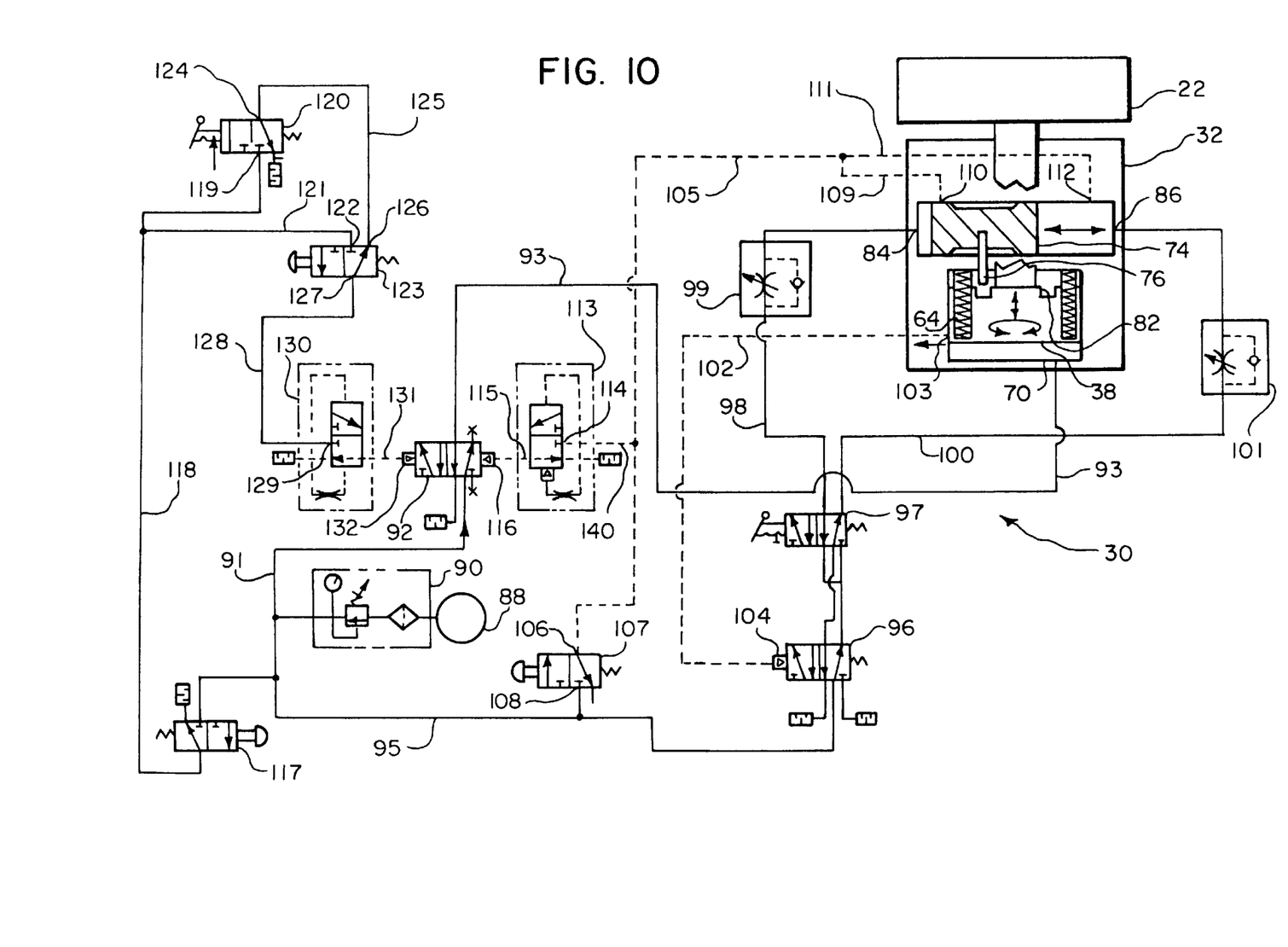
FIG. 10 shows a schematic diagram of compressed air switching circuit for actuating the assembly of FIGS. 2–9.

A novel tool turret operating assembly, generally designated 24, is mounted on the carriage 14. The turret 22, which, in the present example, is capable of holding up to eight separate tools 26 in eight radially extending slots 27 located around a front face of the turret (only one tool is shown attached to the turret in FIG. 1), is rotatably attached to and supported by the assembly 24. An enclosure 28 containing a novel compressed air valve switching circuit, which circuit is shown in FIG. 10 and generally designated 30, is attached to a rear end of the assembly 24. The circuit 30 of FIG. 10 operates the assembly 24 which assembly, in turn, operates the tool turret 22 to bring a desired one of the tools 26 into operative position for engagement with a work piece, not shown. The work piece is held between the head and tail stocks 12 and 18 in a conventional manner.

Referring in addition to FIGS. 2–9, the mechanical assembly 24 and its various components for operating the turret 22 will now be explained. The assembly 24 includes a rectangularly shaped cast iron housing 32 which is enclosed on an otherwise open rear end thereof by a steel cover plate 34. Within the housing 32 is a generally cylindrically shaped actuator which includes a steel main spindle 36 which is inserted through a close conforming cylindrically shaped bore 37 in a generally cylindrically shaped steel main piston 38 and the main piston. An internally threaded nut 40 is removably secured over a conforming externally threaded rear end portion 41 of the spindle 36 to force a flat washer 42 against a rear facing surface of the piston 38 to assure longitudinal forward movement of the spindle 36 and the surrounding piston 38 in unison within the housing 32 when required. A spring biasing mechanism as later more fully explained urges the piston 38 rearwardly against the washer 42 to assure rearward movement of the spindle 36 and piston 38 in unison when required. An elongated and rectangularly shaped key 44 (See FIGS. 3–4 and 9) is inserted in and between opposing and conforming rectangular slots 45 in the spindle 36 and piston 38 (See particularly FIG. 8) to assure rotational movement of the spindle and piston in unison about their common axial centerline upon command as also later explained.

Figure 9:
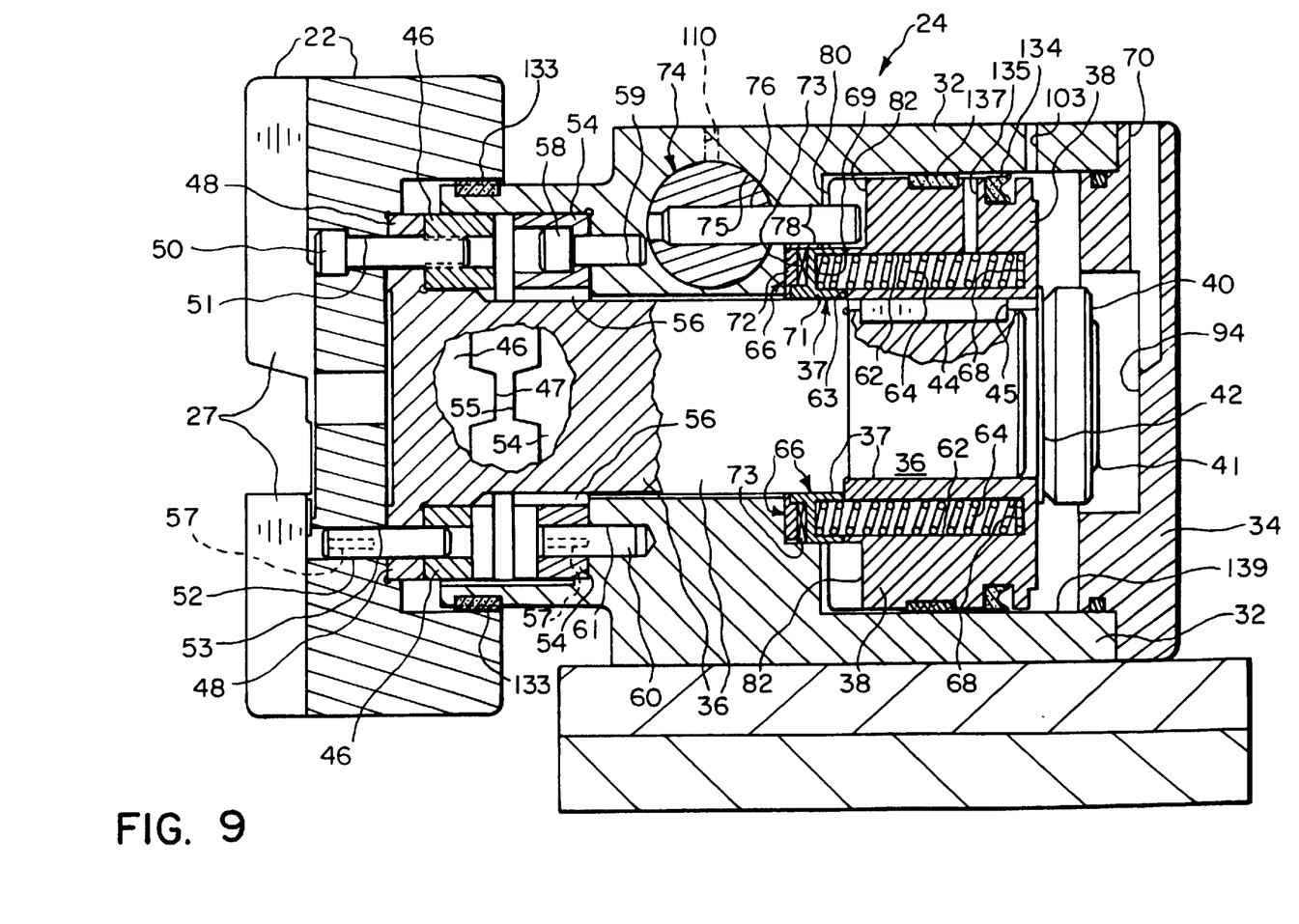
FIG. 9 shows a cross-sectional view of the assembly of FIGS. 2–8 as viewed along cross-section lines 9—9 of FIG. 8 with certain missing parts of FIG. 8 being replaced.

A first annular steel ring 46, containing eight circumferentially spaced apart teeth 47, which teeth are located around a peripheral edge portion of a face of the ring, surrounds a front end portion of the spindle 36. The teeth 47 contain tapered sides and project axially rearwardly. The number of teeth 47 in the first ring 46 is equal to the number of tool slots 27 on the turret 22. The ring 46 is fastened to a circular flange 48 formed on and surrounding a front end of the spindle 36. The flange 48 is, in turn, fastened to the turret 22 by means of four circumferentially spaced apart bolts 50 (See FIGS. 2 and 9 wherein only one of the four bolts is shown). The bolts 50 pass through holes 51 formed through the turret 22 and spindle flange 48 and thread into holes through the ring 46, a front portion of which ring holes are tapped in conformity with the bolts. The four bolts 50 and their corresponding bolt holes 51 are rotationally displaced ninety degrees apart around the circular flange 48. Two conventional threaded pull dowel pins 52 (only one of which is shown in FIG. 9) are press fit into two holes 53 formed through the turret 22, spindle flange 48 and ring 46. The dowel pins 52 and their corresponding holes 53 are formed on the same bolt circle as occupied by the bolts 50 and holes 51 and are located diametrically across from one another on the subject bolt circle. Each of the dowel pins 52 is located mid-way between two different pairs of the bolts 50. Thus, assuming the four bolts 50 are positioned at 0°, 90°, 180° and 270° around the imaginary bolt circle, the two dowel pins 52 would then be located either at 45° and 225° or at 135° and 315° on the same bolt circle as desired. The purpose of the dowel pins 52 is to assure the precisely correct angular alignment of the teeth 47 relative to the turret tool slots 27 when the ring 46 is being installed or reinstalled on the spindle 36 and fastened to the flange 48. Each of the dowel pins 52 contains a tapped blind hole 57 formed along the axial centerlines thereof which opens onto a head thereof. A threaded shaft of a conventional dowel puller tool can be threaded into the hole 57 to permit the dowel pin to be readily pulled out of its corresponding socket 53 when removal of the ring 46 from the flange 48 and spindle 36 is required, all in a conventional and well known manner. The first ring 46 and teeth 47 are, thus, movable in unison with the spindle 36 and turret 22.

Figure 2:
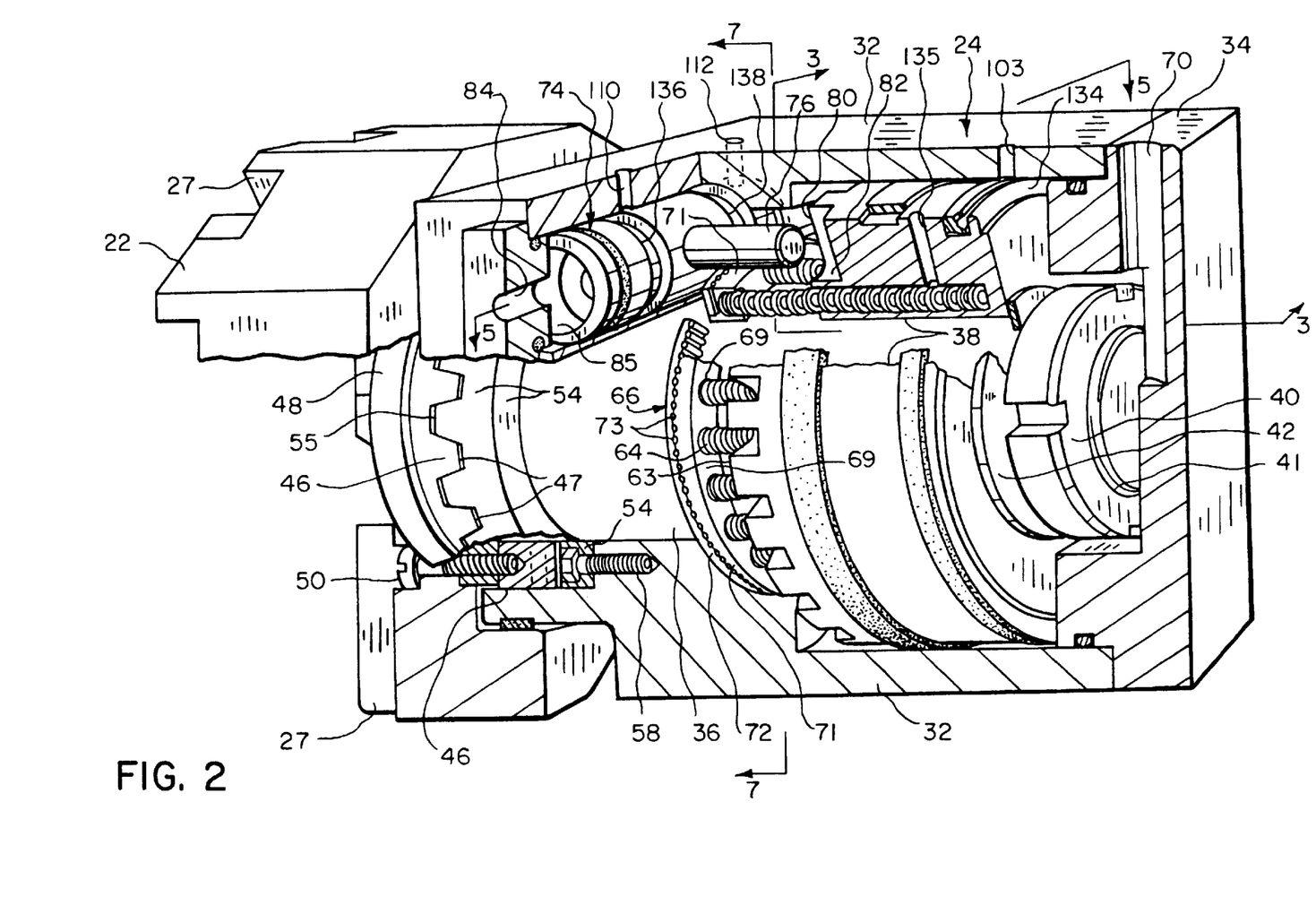
FIG. 2 shows a perspective view of the tool turret and operating assembly of FIG. 1 having portions torn away to permit internal viewing.

A second annular steel ring 54 containing eight circumferentially spaced apart teeth 55 formed along a peripheral edge portion of the face thereof, which are complementary in shape, size and spacing to the teeth 47, surrounds the spindle 36. The teeth 55 contain tapered sides and project axially forwardly. But the inside diameter of the second ring 54 is substantially greater than the outside diameter of the spindle 36 in the region of the latter which passes through the former such that the spindle and second ring do not touch one another as indicated by the presence of an annular air gap 56 in FIG. 9. The second ring 54 is bolted to a forward facing end portion of the housing 32 by four circumferentially spaced apart bolts 58 which are located ninety degrees apart, rotationally, around the spindle bore 37 in four tapped blind holes 59 (only one of the bolts 58 and holes 59 are shown). The second ring 54 and teeth 55 are, thus, fixedly attached to the housing 32. In addition, two conventional threaded pull dowel pins 60 are located 180 degrees apart, rotationally, on the same circle as occupied by the bolts 58 and are removably press fit into two blind holes 61 formed through the ring 54 and into a front surface portion of the housing 32. The dowel pins 60, located as they are in their corresponding blind holes 61, permit precise angular alignment of the teeth 55 of the second ring 54 so as to properly intermesh with the teeth 47 of the first ring 46 as shown in FIG. 2 upon initial installation or reinstallation of the second ring. The dowel pins 60 also contain tapped blind holes 57, similar to and for the same purpose as those of the dowel pins 52. It will be appreciated that a certain liberty has been taken in FIG. 9 in order to show the presence of one of the bolts 50 and one of the dowel pins 52 of the first ring 46 and in order to show the presence of one of the bolts 58 and one of the dowel pins 60 of the second ring 54 in a single drawing figure. In reality, in the cross-sectional view shown in FIG. 9, where the bolts 50 and 58 are positioned on an upper end portion of the flange 48, a second set of the same bolts would normally be seen on a lower end portion of the flange 48 in place of the dowel pins 52 and 60. In reality, then, the dowel pins 52 and 60 as shown would be circumferentially displaced 45 degrees from the position in which they are shown in that figure, in which event they could not be seen in FIG. 9. Accordingly, FIG. 9 is illustrative only of the presence of both bolts 50 and 58 and dowel pins 52 and 60 on and around their corresponding rings 46 and 54, but is not representative of the true angular displacement of the dowel pins 52 and 60 relative to the bolts 50 and 58 shown in that drawing figure.

Figure 3:
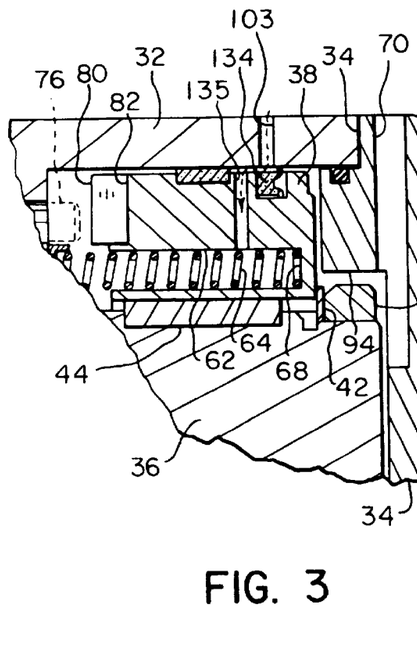
FIG. 3 shows a cross-sectional view of a fragment of the assembly of FIG. 2 as viewed along cross-section lines 3—3 of the latter mentioned figure wherein a main actuator component of the assembly is disposed in a recessed position.
Figure 4:
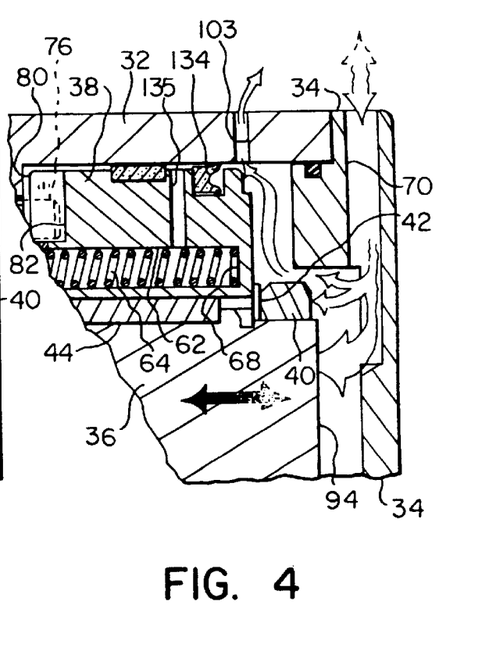
FIG. 4 shows a cross-sectional view of a fragment of the assembly of FIG. 2, the same as shown in FIG. 3 except that, here, the main actuator is disposed in an extended position.
Figure 7:
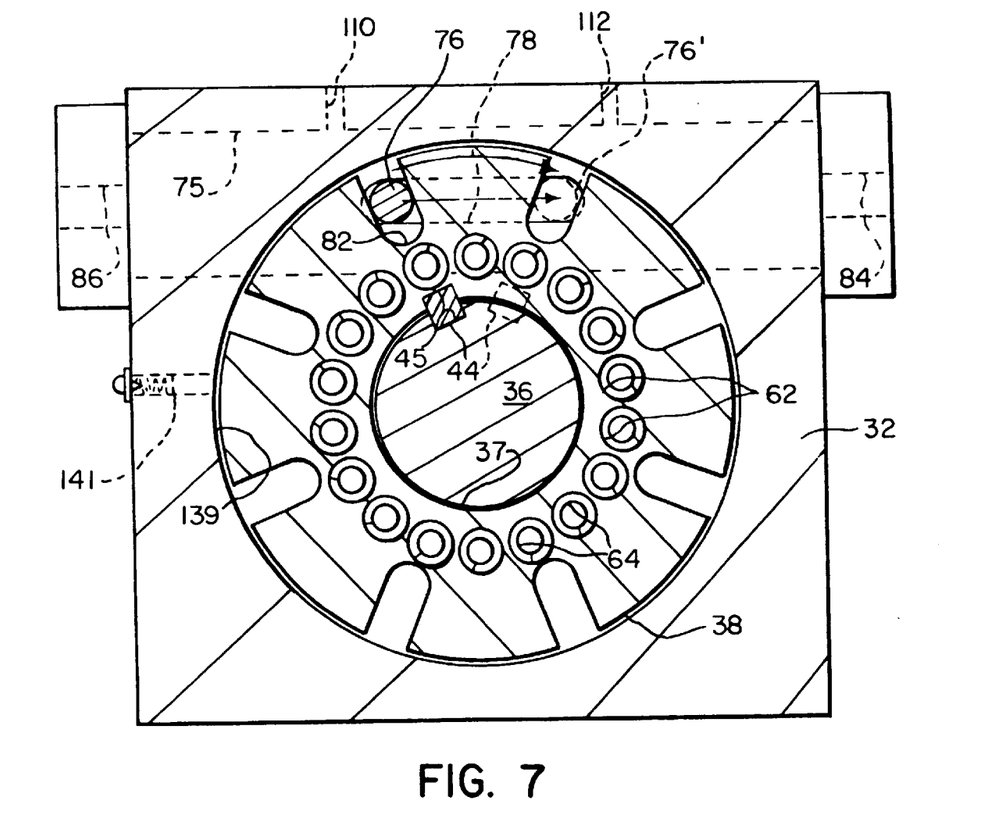
FIG. 7 shows a cross-sectional view of the assembly of FIG. 2 as viewed along cross-section lines 7—7 thereof with an indexing pin component being shown in full at its initial or start position of travel.
Figure 8:
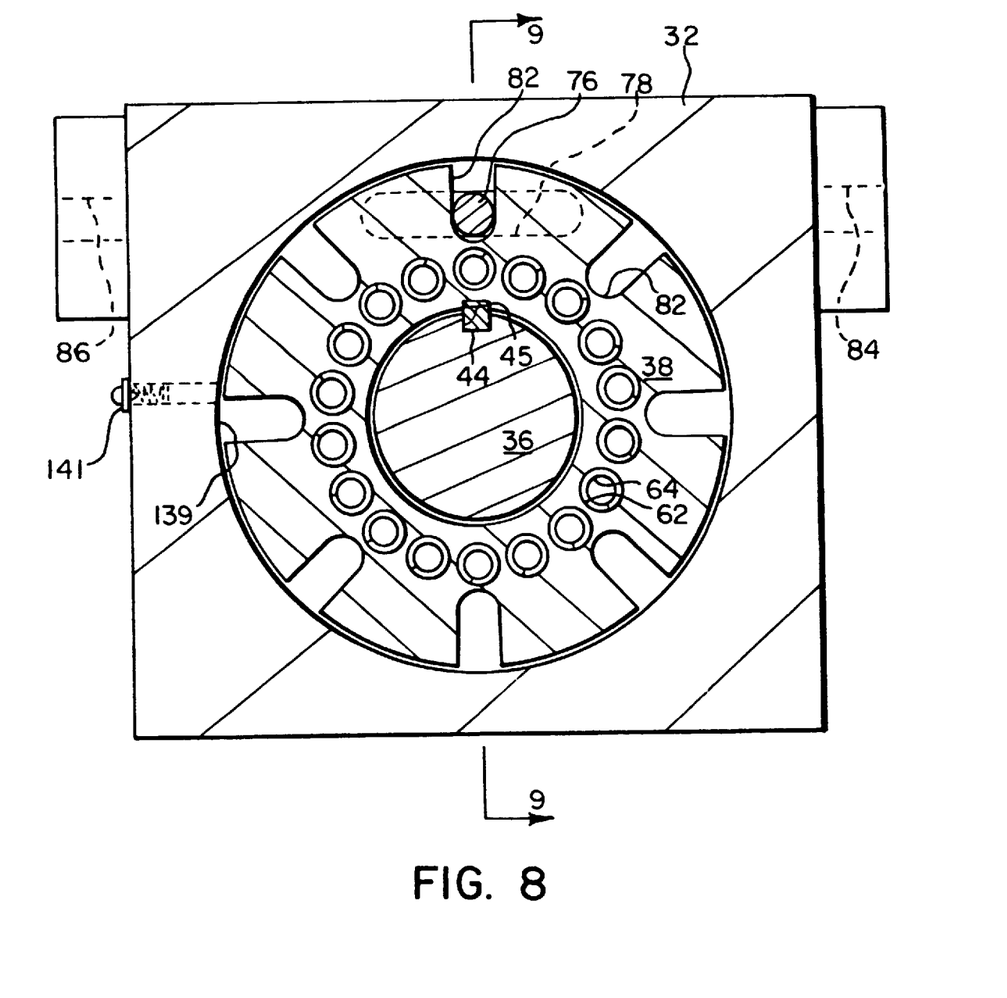
FIG. 8 shows the same cross sectional view as in FIG. 7 except that, here, the indexing pin component is shown at a central position of travel.

A series of eighteen blind holes or spring sockets 62 is formed in a circle in the piston 38 so as to be concentric with the spindle bore 37 (See FIGS. 7–9). Each of the sockets 62 open onto a forwardly facing surface 63 of the piston 38 and contain a coiled spring 64. The springs 64 extend the entire length of the sockets 62 and project forwardly out of the open ends of the sockets into contact with an annularly shaped thrust bearing assembly, generally designated 66, which lies flush against a rear facing surface of the housing 32 around the spindle bore 37. When the spindle 36 and piston 38 are disposed in a first or retracted position in the housing 32, as shown in FIGS. 2–3, wherein the teeth 47 and 55 are closely intermeshed, the springs 64 are confined at a relatively low level of compression between bases 68 of the sockets 62 and rearwardly opening spring sockets 69 (See FIG. 9) formed in a rear face portion of a ring 71 (FIGS. 2 and 9) of the thrust bearing assembly 66. When the spindle 36 and piston 38 are moved longitudinally forwardly in the housing 32 from the retracted position of FIGS. 2–3 to an advanced or extended position of FIGS. 4 and 9 by compressed air applied to a port 70 in the cover plate 34, the ring 46 and turret 22 also move longitudinally such that the teeth 47 of the ring 46 withdraw forwardly from engagement with the teeth 55 of the ring 54 so that the turret 22 can be rotated to bring another one of the tools 26 into operative position with a work piece. Under this condition, the springs 64 become further compressed in the socket 62 due to the movement of the socket bases 68 with the piston 38 toward the thrust bearing assembly 66. When compressed air is sufficiently exhausted from the port 70, as later more fully explained, the now relatively highly compressed springs 64 push between the bases of the stationary spring sockets 69 and the spring socket bases 68 to return the spindle 36 and piston 38 from the advanced position, as shown in FIGS. 4 and 9, back to the retracted position of FIGS. 2–3, thus causing the springs 64 to expand back to a lower level of compression. Accordingly, the teeth 47 and 55 reengage and lock the turret 22 to the housing 32 once again, assuming that the teeth 47 and 55 are properly aligned, rotationally, relative to one another.

The thrust bearing assembly 66 forms an annular ring assembly surrounding the spindle 36 in close conforming relationship therewith as shown best in FIG. 9. The assembly 66 consists of a front thrust washer 72 constructed of hardened steel which lies flush against a rearwardly facing wall of the housing 32 and the ring 71, which may also be made of hardened steel, which is disposed next to and on the rear side of the washer 72. The washer 72 contains the spring sockets 69 into which front end portions of the springs 64 project. An annular gap exists between the ring 71 and washer 72 in which a multitude of cylindrically shaped, radially extending needle bearings 73 is disposed to permit the ring 71 to rotate relative to the stationary ring 72 in a smooth and relatively frictionless manner as the spindle 36 and piston 38 rotate.

Figure 5:
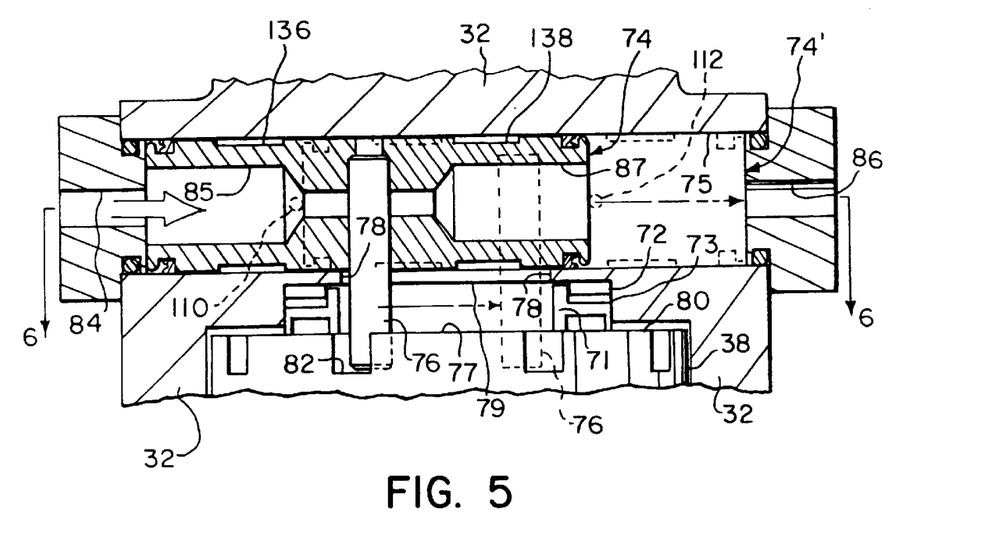
FIG. 5 shows a cross-sectional view of a portion of the assembly of FIG. 2 as viewed along cross-section lines 5—5 of the latter mentioned figure having a turret rotating cross piston shown in full in an initial position.
Figure 6:
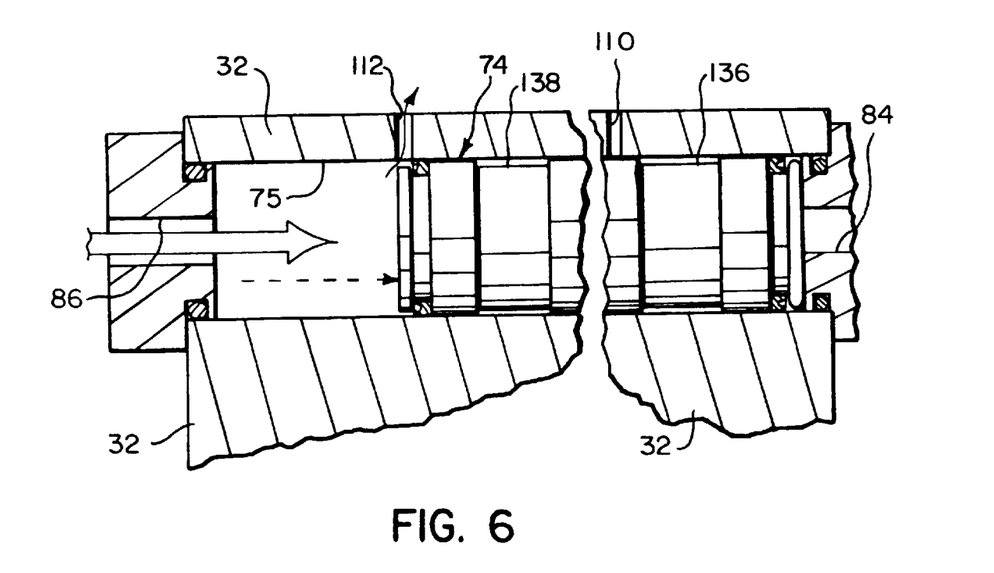
FIG. 6 shows a cross-sectional view of a portion of the assembly of FIGS. 2–5 as viewed along cross-section lines 6—6 of the latter mentioned figure with missing fragments of that figure being replaced and with a cross piston component of that figure shown in full.

In order to rotate the spindle 36 so as to rotate the turret 22 and thereby remove one of the tools 26 from its operative position relative to a work piece and bring another one of the tools mounted in a next succeeding one of the slots 27 into the operative position, the spindle 36 and piston 38 must be rotated incrementally while they are disposed in the advanced position in the housing 32 such that the teeth 47 are completely disengaged from the teeth 55 as shown in FIGS. 4 and 9. Such incremental rotation is brought about on command by the compressed air valve switching circuit 30 of FIG. 10 as later more fully explained. But the mechanical structure of the assembly 24 which is operated by the circuit 30 in order to bring this about includes a cross-piston, generally designated 74, when shown in full, and 74' when shown in phantom. The cross-piston 74, which is generally cylindrically shaped and constructed of steel, is longitudinally slidably disposed in close conforming relationship in a cross-piston bore 75 formed through and across an upper surface portion of the housing 32 as best shown in FIGS. 2, 6 and 9. A solid steel indexing pin 76 in connected to the cross-piston 74 and projects rearwardly from the side thereof through a transversely extending elongated slot 78 formed in the housing 32, which slot opens on a rear facing surface 79 (See FIG. 5) of the housing opposite an upper portion of a front facing surface 80 of the piston 38.

With the spindle 36 and piston 38 in the retracted position in the housing 32 as shown in FIGS. 2–3, a free end of the indexing pin 76 is spaced from and in front of the surface 80. However, when the spindle 36 and piston 38 are moved to the advanced position, as in FIGS. 4–5 and 9, the pin 76 inserts into one of eight forwardly and radially outwardly opening slots 82 formed in a front surface portion of the piston 38. The slots 82 are equally spaced apart rotationally around the piston 38 and correspond in rotational alignment to the eight teeth 47 and eight teeth 55 of the rings 46 and 54, respectively, and to the eight tool slots 27 in the turret 22. The rotational alignment of the slots 82 is such that, when the spindle 36 and piston 38 are at the retracted position such that the teeth 47 are intermeshed with the teeth 55, as in FIG. 2, the indexing pin 76 is spaced from but directly aligned for insertion into one of the slots 82 and the cross-piston 74 is located at an initial or starting position at one end or the other of the cross-piston bore 75 as shown in FIG. 5. When the cross-piston 74 is at such a starting position as shown either at 74 or 74' in that figure, the indexing pin is located near one end or the other of the slot 78 as shown in FIG. 7 at either 76 or 76', respectively. In the present example, the starting position of the cross-piston 74 is located on a left end portion of the bore 75 and the indexing pin 76 is located near the left end of the slot 78 as viewed in FIG. 7. However, the starting position of the cross-piston 74 in the bore 75 and of the indexing pin 76 in the slot 78 can be changed to the opposite side of the bore 75 and slot 78, respectively, simply by manually switching a turret rotation directional valve 97 of the circuit 30 of FIG. 10 to the opposite state. Thus, the spindle 36 and piston 38 can be rotated in either a clockwise or counterclockwise direction as desired.

With the indexing pin 76 in its selected starting or third position as shown in full in FIG. 7, compressed air is introduced into the port 70 in the cover plate 34 to move the spindle 36 and piston 38 from the retracted position to the advanced position to disengage the teeth 47 from the teeth 55, whereby the indexing pin 76 is inserted into an opposing one of the slots 78. Compressed air is then introduced into a port 84 at one end of the cross-piston bore 75 from the circuit 30 to drive the cross-piston 74 to a fourth or ending position at the other end of the bore 75 as shown in FIG. 5 at 74'. As the cross-piston 74 moves longitudinally along the bore 75, the indexing pin 76 also moves longitudinally along the slot 78 in the housing 32, and also radially slidably bears against a sidewall of one of the slots 82 in the main piston 38 in which the pin is inserted to thereby cause the piston 38 to rotate incrementally. Accordingly, the spindle 36 and the turret 22 are, likewise, incrementally rotated to remove one of the tools 26 from an operative position and to rotate another one of the tools 26 next in rotational sequence from a storage position into the operative position. Once this incremental rotation is completed, the circuit 30 operates to return the spindle 36 and piston 38 to the retracted position, whereby the slot 82 in which the indexing pin 76 has been located is withdrawn from the pin 76. Simultaneously, the teeth 47 and 55 reengage, and the pin 76, which is now clear of the slot 82, is returned with the cross-piston 74 to the start position ready to start a new cycle of incremental rotation of the spindle 36 and piston 38 when desired.

As shown in FIG. 5, the air inlet port 84 communicates with a first hollow chamber 85 located in one end of the cross-piston 74. Compressed air introduced into the port 84 and the chamber 85 drives the cross-piston from the start position at 74 to the advanced position at 74' to incrementally rotate the piston 38 in one direction through an angle equal to the angle between the radial centerlines of two successive ones of the slots 82. On an opposite side of the cross-piston bore 75, an air inlet port 86 communicates with a second hollow chamber 87 located in the other end of the cross-piston 74. Compressed air introduced into the port 86 and chamber 87 at an appropriate time in the cycle returns the cross-piston from its fourth or ending position at 74' back to its third or start position as shown at 74. The initial stroke of the cross-piston from its start position at 74 to its ending position at 74' occurs only when the spindle 36 and piston 38 are in their advanced position in the housing 32 such that the teeth 47 are disengaged from the teeth 55. On the other hand, the return stroke of the cross-piston from its advanced position at 74' to its start position at 74 occurs only after the spindle 36 and piston 38 have been returned from their advanced position to their retracted position in the housing 32 so as to decouple the indexing pin 76 from the piston 38.

Accordingly, upon completion of the return stroke, the cross piston 74 and indexing pin 76 are reset and, thus, made ready for initiation of the next cycle of incremental rotation of the spindle and piston to bring yet another one of the tools 26 next in sequence to the operative position.

Referring now to all of the drawing figures, the compressed air circuit 30 of FIG. 10 and its relationship to the assembly 24 will now be explained. The circuit 30 of the present example is adapted for use with a conventional compressed air source 88 which supplies a gauge air pressure of from about 70 to about 85 psi. All of the air valves used in the circuit 30 are conventional and well known components in the art. The source 88 supplies air through a conventional filter regulator 90 and a line 91, thence through a 4-way pilot operated main piston air valve 92 to an air line 93 and, finally, to the air inlet port 70 (See also FIGS. 2 and 9) in the cover plate 34. As shown in FIGS. 3–4 and 9, the port 70 communicates with a chamber 94 behind the spindle 36 and main piston 38 such that, when the port 70 receives compressed air, the spindle 36 and main piston 38 move in unison from their retracted position to their extended position in opposition to the bias of the springs 64, thus further compressing the springs 64 in the process. Compressed air is also supplied from the filter regulator 90 through a line 95, a 4-way, spring return indexing valve 96 and the 4-way, detented, spring return turret rotation directional valve 97. At this point in the circuit 30, the valve 97 supplies air to either a line 98 and, through an adjustable flow control valve 99, to the air inlet port 84 of the cross-piston bore 75, or through a line 100 and an adjustable flow control valve 101 to the air inlet port 86 of the cross-piston bore, depending upon the setting of the valve 97 which determines the direction of rotation of the turret 22. One end of a pilot air line 102 is connected to a pilot port 103, which extends through an upper surface of the housing 32 for communication with the chamber 94 when the spindle 36 and main piston 38 are in the advanced position as best shown in FIG. 4. The other end of the pilot air line 102 is connected to a port 104 of the indexing valve 96 so as to oppose the spring bias of that valve when pressurized. All pilot air lines shown in FIG. 10 are shown as dashed lines to distinguish them from main air lines supplied by the source 88.

Another pilot air line 105 is connected, on one end thereof, to a port 106 of a 3-way, spring return reset valve 107. A port 108 of the reset valve 107 is also connected to the main air source 88 through the line 95. The other end of the line 105 branches, in one direction, through a pilot air line 109 to a pilot port 110 which extends through the housing 32 to the cross-piston bore 75 on one end portion thereof. The line 105 also branches through a pilot air line 111 to a pilot port 112 which extends through the housing 32 to the bore 75 on an opposite end portion of the bore 75 from that of the port 110. A pulse valve 113 is connected from its inlet port 114 to the pilot line 105 between the reset valve 107 and the branch lines 109 and 111. A port 115 of the pulse valve 113 is connected to a pilot port 116 of the valve 92. The source 88 is also connected through the filter regulator 90 to a 3-way spring return valve 117 which is, in turn, connected as shown through an air line 118 to a port 119 of a 3-way, detented, spring return auto/manual selector valve 120 and, through a branch line 121 to a port 122 of a 3-way, spring return manual index valve 123. A port 124 of the selector valve 120 is also connected through a line 125 to a port 126 of the manual index valve 123. A port 127 of the valve 123 is connected through a line 128 to a port 129 of a second pulse valve 130 which is similar to the pulse valve 113. The valve 130 is also connected through a pilot line 131 to a port 132 of the valve 92 to complete the circuit 30.

The typical operating cycle of the air circuit 30 and the assembly 24 will now be explained. Initially, assume the spindle 36 and main piston 38 are in a first or retracted position as shown in FIGS. 2–3 wherein the teeth 47 are closely intermeshed with the teeth 55 to lock the turret 22, through the spindle 36 and piston 38, to the housing 32. Under such conditions, the main piston 38 is withdrawn from the indexing pin 76 so as to be completely decoupled therefrom. Further, assume that the cross-piston 74 is disposed in a third or start position at the end of the bore 75 on which the air inlet port 84 is disposed as shown in FIG. 2. Under these conditions, while the indexing pin 76 is decoupled from the main piston 38, it is, nevertheless, aligned for entry into an opposing one of the slots 82 in the main piston. Accordingly, the start position alignment of the pin 76 is as shown in full in FIG. 7. Further, under these conditions, the cross-piston air inlet port 86 is pressurized from the source 88 through the index cylinder valve 96 and the turret rotation selector valve 97 to maintain the cross-piston 74 at its start position.

With the valves 96 and 97 so positioned, no air pressure is applied to the port 84 of the cross-piston bore 75 from the circuit 30. Also, the pilot port 112 is pressurized through the cross-piston bore 75 around one end of the cross-piston 74 from the now pressurized port 86 as illustrated in FIG. 6. Next, there is no pressurization from the circuit 30 on the port 70. Finally, any residual pilot pressure in the line 102 is bled off through the pilot port 103 around a front side of a conventional lip seal 134, thence through an air passage 135 formed in the main piston 38 which extends into communication with one of the spring sockets 62 in the interior of the assembly 24 as illustrated in FIGS. 2–3. This causes the interior of the assembly 24 to achieve a positive air pressure to inhibit internal contamination of the mechanical components from external sources. Air entering the assembly interior as aforesaid filters forwardly through the single spring socket 62, thence between the spindle 36 and its bore 37 and thence, through the gap 56 and the gap between the rings 46 and 54. Finally, this pilot air emerges around a forward end of the housing 32 between an outer surface of the ring 46 and an opposing surface of the housing and exits the assembly 24 through a series of grooves formed across a conventional annularly shaped first wear strip or wear ring 133 to ambient atmosphere. The wear strip may be of any suitable type including one constructed of powered bronze impregnated polymer plastic.

To initiate a cycle of operation of the assembly 24 and circuit 30, the spring return switch of the auto index valve 117 is momentarily engaged to supply an air signal to the auto/manual valve 120 and, through that valve, to the manual index valve 123. Such activation of the valve 123 triggers the pulse valve 130, through the line 128, to shift the two position main cylinder valve 92 so as to supply air from the source 88, through that valve along the line 93 to the port 70 in the housing cover plate 34. Accordingly, high pressure air fills the chamber 94 to move the main actuator, which, in this example, includes the spindle 36 and main piston 38, from its first or recessed position, as shown in FIGS. 2–3, to its second or advanced position as shown in FIGS. 4 AND 9. As a result, the teeth 47 are retracted forwardly fully out of engagement with the teeth 55 to render the turret 22 rotatable, and the indexing pin 76 enters one of the slots 82 in the main piston with which the pin was aligned initially. The condition of the assembly 24 is now as shown in FIGS. 5 and 9.

As shown best in FIG. 4, as the main piston 38 advances to a position near the end of its forward travel, the lip seal 134 slides forwardly to expose the pilot port 103 to the now pressurized chamber 94, whereby a small volume of air inters the port 103 and the pilot line 102 from the air chamber 94. As a result, the lip seal 134 is expanded tightly against the inner wall of the housing 32 by air pressure in the chamber 94 to prevent air from leaking from the chamber 94 and pilot port 103 into passage 135. High pressure air thus supplied to the pilot port 103 from the chamber 94 and port 70 is applied along the pilot line 102 to shift the index cylinder valve 96 against its bias spring to supply air from the source 88 through the valves 96 and 97 and to switch pressurization from the port 86 to the port 84 to move the cross-piston 74 from its third or start position to its fourth or ending position. Accordingly, the index pin 76 moves along the elongated slot 78 in the housing 32 and, rotates the main piston 38 to, in turn, rotate the spindle 36 and the turret 22 in unison through an angle sufficient to move a next one of the tool mounting slots 27 from a storage position next in rotary sequence to the operative position. As shown by comparison of FIGS. 7 and 8, the pin 76 is free to slide radially inwardly and outwardly along the slot 82 as it bears against one of a sidewall thereof to permit the main piston 38 to rotate through the proper angle while the pin 76 travels with the cross-piston in a straight line along the elongated slot 78 in the housing 32.

When compressed air is switched from the port 86 to the port 84, residual air in the port 86 is exhausted through the line 100 and the valves 97 and 96 and, thereafter, through a muffler to ambient atmosphere. As the cross-piston 74 advances, pilot signal pressure trapped in the lines 105, 109 and 111 will be exhausted through the ports 110 and 112 in the housing 32 into and around annular grooves 136 and 138, respectively, around the cross-piston 74, thence through the indexing pin slot 78 to maintain positive pressurization in the assembly 24 as occurred previously through the pilot port 103 and passage 135. As in the previous instance, this exhausted air in the assembly 24 takes the same path and filters to ambient atmosphere through the grooves crossing the wear strip 133 next to the turret 22.

As the cross-piston 74 approaches close to the end of its travel, the pilot port 110 comes into communication with the now pressurized port 84 to raise the air pressure in the line 105 and a line 140, through the pulse valve 113 to the port 116 of the main cylinder valve 92 to switch the latter back to its initial state. This causes residual air from the port 70 and housing chamber 94 to be exhausted back through the line 93, the valve 92 and a muffler to ambient atmosphere. Upon exhausting this residual air from the port 70 and the chamber 94, the spindle 36 and main piston 38 return, under the influence of the now relatively highly compressed springs 64, from their second or advanced position back to their first or recessed position to once again lock the turret 22, through the spindle 36 and main piston 38, to the housing with a next succeeding one of the tools 26 in the rotary sequence now disposed in the operative position. Simultaneously, the main piston 38 moves rearwardly in the housing 32 to decouple the indexing pin 74 from the piston slot 82 in which it has been inserted for rotating the main piston.

As the main piston 38 returns to its recessed position, the pilot port 103 is once again isolated from the housing chamber 94 by the lip seal 134, but the lip seal now allows pressure in the line 102 to bleed through the pilot port 103 into the assembly 24 through the passage 135. As the pressure drops in the line 102, the index cylinder valve 96 returns to its initial position under the influence of its biasing spring, whereby air pressure is removed from the cross-piston port 84 and is reapplied to the port 86 to return the cross-piston 74 from its fourth or advanced position back to its third or start position to complete the cycle. A second conventional wear strip or ring 137, which may be constructed of the same type of material as in the first wear ring 133, is mounted in a groove around the main piston 38 to bear against a cylinder wall 139 of the housing 32 as the main piston rotates. It may also contain a series of grooves crossing its outer surface which are spaced around the ring in order to allow lubricating oil to be wiped along the cylinder wall 139 as the piston moves. As shown in FIGS. 7–8, a conventional oiler valve 141 extends through a side of the housing 32 to an opening on the cylinder wall 139 to provide access for lubricating oil.

Although the present invention has been described with respect to specific details of a certain preferred embodiment thereof it is not intended that such details limit the scope of this patent other than as expressly set forth in the following claims.

What is claimed is:

1. In combination with a rotary tool turret of a lathe containing a plurality of circumferentially spaced apart tool mounting positions for mounting separate radially projecting tools therein, said turret being rotatable through a predetermined angle to remove one of said tools from an operative position relative to a work piece rotatably held in said lathe to a storage position and to, simultaneously, move a next succeeding one of said tools from a storage position to said operative position, an assembly for operating said turret comprising:

(A) a housing;
   (B) an actuator movably mounted in said housing, said turret being fixedly attachable through an opening in the housing to said actuator for movement therewith, said actuator being selectively rotatable through said angle and being selectively movable linearly between a first position and a second position;
   (C) a mechanism for selectively locking said actuator to said housing to maintain said actuator in a fixed position relative to said housing;
   (D) a biasing mechanism operatively disposed between said actuator and said housing which tends to maintain said actuator in said first position, said locking mechanism being operative to lock said actuator to said housing only when said actuator is disposed in said first position;
   (E) a turret translating device for selectively moving said actuator from said first position to said second position in opposition to said biasing mechanism to unlock said locking mechanism; and
   (F) a turret rotating device operatively connected between said housing and said actuator only when said actuator is disposed in said second position for rotating said actuator through said angle to bring a next succeeding one of said tools from a storage position next in rotational sequence into said operative position.

2. The assembly of claim 1 wherein said actuator comprises a spindle movably mounted in said housing, said turret being fixedly attachable through an opening in said housing to said spindle for movement therewith; and
   a main piston movably mounted in said housing and being fixedly connected to said spindle for movement therewith, said locking mechanism being attached between said spindle and said housing, said biasing mechanism being operatively disposed between said main piston and said housing, said turret rotating device being operatively connected between said housing and said main piston.

3. The assembly of claim 1 wherein said turret translating device comprises a switching circuit of compressed air operated valves.

4. The assembly of claim 1 wherein said turret rotating device comprises a cross-piston disposed in said housing and being linearly movable between a third position and a fourth position;
   an indexing pin attached to said cross-piston and projecting perpendicular to the path of movement of said cross-piston, said actuator defining a series of circumferentially spaced apart slots disposed in a circle in a surface portion of said actuator, said slots opening onto a first surface of said actuator which faces said pin, said pin being spaced apart from but aligned for insertion into one of said slots when said cross-piston is disposed in said third position and when said actuator is disposed in said first position, said pin being inserted into said one of said slots as said actuator is moved from said first to said second position; and
   a cross-piston actuating device for moving said cross-piston from said third position to said fourth position only after said actuator is moved from said first position to said second position to cause said pin to rotate said actuator through said angle, said actuating device also for moving said cross-piston from said fourth position back to said third position only after said actuator is returned from said second position back to said first position.

5. The assembly of claim 1 wherein said locking mechanism comprises a first ring fixedly attached to and surrounding said actuator for movement therewith, said first ring including a first series of circumferentially spaced apart teeth disposed around a peripheral edge portion of a face thereof, said first series being equal to said plurality of tool mounting positions; and
   a second stationary ring fixedly attached to said housing including a second series of circumferentially spaced apart teeth disposed around a peripheral edge portion of a face thereof, said second series being equal to said plurality of tool mounting positions, said first and second series of teeth being closely intermeshed when said actuator is disposed in said first position to lock said actuator to said housing, said rings being completely disengaged to unlock said actuator from said housing to permit rotary movement of said actuator when said actuator is disposed in said second position.

6. The assembly of claim 1 wherein said biasing mechanism comprises a spring biasing mechanism.

7. The assembly of claim 2 wherein said spindle and said main piston are generally cylindrically shaped, said spindle being removably inserted through a cylindrically shaped bore in said main piston in close conforming relationship wherein both said spindle and main piston are rotatable about a common longitudinal axis.

8. The assembly of claim 4 wherein said cross-piston actuating device comprises a compressed air valve switching circuit.

9. The assembly of claim 4 wherein said cross-piston is elongated and generally cylindrically shaped and is longitudinally slidably disposed in a cylindrically shaped bore formed in a panel of said housing, said indexing pin projecting through an elongated slot formed in said housing next to said cross-piston bore, said elongated slot opening onto a surface of said housing which opposes said first surface of said actuator.

10. The assembly of claim 6 wherein said spring biasing mechanism comprises a group of circumferentially spaced apart coiled springs disposed in a concentric circle around an axis of rotation of said actuator, said actuator defining a group of sockets in which said springs are disposed, said sockets opening on a surface of said actuator facing an opposing surface of said housing, said springs being confined between their respective socket bases in said actuator and said housing at a relatively low level of compression when said actuator is disposed in said first position and at a relatively higher level of compression when said actuator is disposed in said second position, said relatively low level of compression being sufficient to maintain said actuator in said first position so long as said turret translating device is inoperative, said relatively higher level of compression being sufficient to return said actuator from said second position to said first position upon deactivation of said turret translating device.

11. The assembly of claim 7 further comprising
a threaded fastener, a rear end portion of said spindle being threaded so as to threadably receive said fastener, and
a flat washer removably disposed over and surrounding said spindle rear end portion, said fastener being removably fastened to said rear end portion so as to force said washer tightly against a surface of said main piston which surrounds said spindle such that said spindle and main piston move in unison from said first position to said second position when said turret translating device is activated, said biasing mechanism urging said main piston against said washer to move said spindle and main piston in unison from said second position to said first position when said turret translating device is deactivated.

12. The assembly of claim 9 wherein said cross-piston defines a first hollow chamber in one end portion thereof and a second hollow chamber, isolated from said first chamber, in an opposite end portion thereof, said first chamber and said second chamber opening onto opposite ends of said cross-piston, said assembly further comprising
a first fluid inlet port disposed over one end of said cross-piston bore and communicating with said first chamber; and
a second fluid inlet port disposed over an opposite end of said cross-piston bore and communicating with said second chamber, said first inlet port and said second inlet port being accessible to a pressurized fluid source for moving said cross-piston between said third position and said fourth position when said fluid source is activated.

13. In combination with a rotary turret of a lathe containing a plurality of circumferentially displaced positions for mounting up to a selected maximum number of separate radially projecting tools thereon, wherein said turret can be incremental rotated to bring each one of said tools into an operative position sequentially relative to a work piece held in said lathe, an assembly for operating said turret comprising
(A) a housing;
(B) a spindle movably mounted in said housing, said turret being fixedly attached to said spindle for movement therewith, said spindle being rotatable in increments of a circle and being linearly translatable between a retracted position and an advanced position;
(C) a main piston disposed in said housing and being fixedly connected to said spindle for movement therewith;
(D) a first ring attached to and surrounding said spindle for movement therewith, said first ring including a first series of circumferentially spaced apart teeth disposed around a peripheral edge portion of a face thereof, said first series being equal to said plurality of positions;
(E) a second stationary ring attached to said housing including a second series of circumferentially spaced apart teeth disposed around a peripheral edge portion of said face, said second ring surrounding but concentrically spaced apart from said spindle, said second series being equal to said plurality of positions;
(F) a spring biasing mechanism operatively disposed between said main piston and said housing for urging said spindle and main piston toward said retracted position, said first and second series of teeth being closely intermeshed when said spindle is in said retracted position;
(G) a turret translator device for moving said main piston and spindle from said retracted position to said advanced position in opposition to said biasing mechanism to disengage said first series of teeth from said second series of teeth; and
(H) a turret rotator device operatively connected to said main piston only when said spindle is disposed in said advanced position and being attached to said housing for incremental rotating said turret to bring a succeeding one of said tool mounting positions into said operative position.

14. An assembly for operating a rotary tool turret comprising
(A) a housing;
(B) an actuator movably mounted in said housing and being fixedly attachable through an opening in said housing to a tool turret located external to said housing, said actuator being selectively movable linearly along an axis of rotation of said turret between a first position and a second position and being selectively rotatable on said axis;
(C) a locking mechanism for stationarily locking said actuator to said housing to render said actuator immobile when said actuator is disposed in said first position and for unlocking said actuator from said housing to permit rotary movement of said actuator when said actuator is disposed in said second position;
(D) a biasing mechanism operatively connected between said actuator and housing for biasing said actuator toward said first position; and
(E) a device for selectively moving said actuator from said first position to said second position in opposition to said biasing mechanism to unlock said locking mechanism to permit rotary movement of said turret.

15. The assembly of claim 14 wherein said locking mechanism comprises
a first ring of circumferentially spaced apart teeth disposed around a peripheral edge portion of a face of said first ring, said teeth having tapered sides and projecting axially from said first ring, said first ring being fixedly attached to said actuator; and
a second ring of circumferentially spaced apart teeth disposed around a peripheral edge portion of a face of said second ring, said teeth having tapered sides and projecting axially from said second ring, said second ring of teeth being fixedly attached to said housing, the teeth of said first ring being closely intermeshed with the teeth of said second ring when said actuator is disposed in said first position, said first ring and said second ring being completely decoupled when said actuator is disposed in said second position.

16. The assembly of claim 14 wherein said biasing mechanism comprises a plurality of coiled springs operatively disposed between said actuator and housing.

17. The assembly of claim 14 wherein said device comprises a compressed air valve switching circuit, said circuit being operative to directly drive said actuator from said first position to said second position with compressed air introduced into said housing.

18. The assembly of claim 14 wherein said device is also operative to rotate said actuator through a predetermined angle immediately after said actuator has been moved from said first position to said second position.

19. The assembly of claim 16 further comprising an annularly shaped thrust bearing disposed between said housing and said coiled springs, first corresponding ends of said springs being inserted into spring sockets defined by said thrust bearing, second corresponding ends of said springs being disposed in spring sockets defined in said actuator.

20. The assembly of claim 17 wherein said circuit is also operative to rotate said actuator through a predetermined angle immediately after said circuit has operated to move said actuator from said first to said second position.

21. The assembly of claim 17 wherein said circuit is also operative to introduce high pressure air into said housing to inhibit introduction into said housing of contaminates from sources external to said housing and circuit.

22. The assembly of claim 20 further comprising a cross-piston movably disposed in a bore defined by said housing, said cross-piston being linearly movable along said bore between a start position and an ending position, said cross-piston being operatively coupled to said actuator when said actuator is disposed in said second position for rotating said actuator through said angle as said cross-piston moves from said start position to said ending position, said cross-piston being decoupled from said actuator when said actuator is disposed in said first position, said circuit being operatively connected to said cross-piston bore for introducing high pressure air into one end of said cross-piston bore to move said cross-piston from said start position to said ending position to rotate said actuator through said angle immediately after said actuator has been moved from said first position to said second position, and for switching said high pressure air from said one end to an opposite end of said cross-piston bore to move said cross-piston from said ending position back to said start position immediately after said actuator is moved by said biasing mechanism from said second position back to said first position.

23. An assembly for operating a rotary tool turret comprising
(A) a housing;
(B) an actuator movably mounted in said housing and being fixedly attachable through an opening in said housing to a tool turret located external to said housing, said actuator being selectively rotatable about an axis of rotation of said turret;
(C) a device for selectively locking said actuator to said housing to render said actuator immobile;
(D) a cross-piston movably disposed in a cross-piston bore defined by said housing, said cross-piston being linearly movable along said cross-piston bore between a start position and an ending position; said cross-piston being operatively coupled to said actuator only when said locking device is unlocked for rotating said actuator through a predetermined angle as said cross-piston moves from said start position to said ending position and being decoupled from said actuator when said locking device is locked;
(E) a compressed air switching circuit for introducing a first mass of high pressure air into one end of said cross-piston bore for moving said cross-piston from said start position to said ending position immediately after said locking device is unlocked and for removing said first air mass from said one side and applying a second mass of high pressure air to an opposite side of said cross-piston bore immediately after said locking device is locked for returning said cross-piston from said ending position to said start position and for maintaining said cross-piston in said start position until the next time said locking device is unlocked.

24. The assembly of claim 22 wherein said actuator comprises
a generally cylindrically shaped main piston containing a cylindrically shaped spindle bore therethrough; and
a generally cylindrically shaped spindle having a rear end portion inserted through said spindle bore, said spindle and piston being fastened together for movement in unison, said spindle having a front end portion projecting forwardly out of said housing, said spindle front end portion containing a radially projecting circular flange, said flange being fixedly attachable to said turret, said spindle and main piston being rotatable about said axis.

25. The assembly of claim 24 further comprising a cover plate removably disposed over an otherwise open rear end of said housing.

26. The assembly of claim 25 wherein said housing defines an air chamber between said cover plate and said main piston, said cover plate defining an air passageway therethrough which extends from an edge thereof into communication with said air chamber.

27. A method for operating a rotary tool turret, the steps of which comprise
(A) providing a housing;
(B) providing an actuator which is movably mounted in said housing, said actuator being fixedly attachable through an opening in said housing to a tool turret which is located external to said housing, said actuator being linearly movable in said housing between a first position and a second position;
(C) locking said actuator to said housing to render said actuator immobile when said actuator is disposed in said first position;
(D) unlocking said actuator from said housing to permit rotary movement of said actuator when said actuator is disposed in said second position;
(E) biasing said actuator toward said first position; and
(F) moving said actuator from said first position to said second position in opposition to said biasing step to render said actuator rotatable relative to said housing.

28. The method of claim 27, the steps of which further comprise rotating said actuator through a predetermined angle following said actuator moving step.

29. The method of claim 27, the steps of which further comprise
introducing a mass of pressurized air into said housing about said actuator to prevent contamination of said actuator from ambient atmosphere sources; and
exhausting said air from said housing following circulation thereof about said actuator.

* * * * *